US012784736B2

(12) United States Patent
Jia et al.

(10) Patent No.: US 12,784,736 B2
(45) Date of Patent: Nov. 3, 2026

(54) AUDIO PROCESSING METHOD AND ELECTRONIC DEVICE

(71) Applicant: Lenovo (Beijing) Limited, Beijing (CN)

(72) Inventors: Yan Jia, Beijing (CN); Junjie Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 463 days.

(21) Appl. No.: 18/457,709

(22) Filed: Aug. 29, 2023

(65) Prior Publication Data

US 2024/0078997 A1 Mar. 7, 2024

(30) Foreign Application Priority Data

Sep. 1, 2022 (CN) ......................... 202211066538.3

(51) Int. Cl.
*G10L 15/02* (2006.01)
*G10L 15/04* (2013.01)
*G10L 15/08* (2006.01)

(52) U.S. Cl.
CPC .............. *G10L 15/02* (2013.01); *G10L 15/04* (2013.01); *G10L 15/08* (2013.01)

(58) Field of Classification Search
CPC .......... G10L 15/02; G10L 15/04; G10L 15/08
See application file for complete search history.

(56) References Cited

U.S. PATENT DOCUMENTS

2022/0310072 A1* 9/2022 Sainath .................. G06N 3/045
2023/0109407 A1* 4/2023 Hu .......................... G10L 15/02 704/232

OTHER PUBLICATIONS

Sainath, Tara N., et al. "An attention-based joint acoustic and text on-device end-to-end model." ICASSP 2020-2020 IEEE International Conference on Acoustics, Speech and Signal Processing (ICASSP). IEEE, 2020. (Year: 2020).*

* cited by examiner

*Primary Examiner* — Bhavesh M Mehta
*Assistant Examiner* — Edward Tracy, Jr.
(74) *Attorney, Agent, or Firm* — ANOVA LAW GROUP, PLLC

(57) ABSTRACT

An audio processing method includes obtaining a current to-be-recognized target audio block of a to-be-recognized audio, recognizing text information corresponding to the target audio block to obtain an audio block recognition result, based on the audio block recognition result, determining a first sub-block recognition result corresponding to a current sub-block formed by a starting audio block to the target audio block of the to-be-recognized audio, performing a combination process on identical text sequences of the first sub-block recognition result corresponding to different recognition paths, determining a second sub-block recognition result of the current sub-block based on a result of the combination process, and determining a text recognition result of the to-be-recognized audio based on the second sub-block recognition result. The combination process improves a recognition probability of an identical text sequence matching any one recognition path of the recognition paths corresponding to the identical text sequences.

20 Claims, 5 Drawing Sheets

(c) RNN-T

AUDIO PROCESSING METHOD AND ELECTRONIC DEVICE

CROSS-REFERENCE TO RELATED APPLICATION

The present disclosure claims priority to Chinese Patent Application No. 202211066538.3, filed on Sep. 1, 2022, the entire content of which is incorporated herein by reference.

TECHNICAL FIELD

The present disclosure relates to the audio recognition technology field and, more particularly, to an audio processing method and an electronic device.

BACKGROUND

End-to-end audio recognition refers to a process of directly obtaining a text sequence from an audio feature vector sequence using a deep neural network.

Currently, the end-to-end audio recognition with good effect normally uses the two-pass (i.e., two times of decoding) module design. Through one time decoding, the two-pass module obtains a 1-pass decoding result in an online streaming format. Through the two-pass decoding processing, the performance of the audio recognition is improved by re-rating/re-arrange N-best information (i.e., corresponding to N text results with probabilities belonging to topN).

However, the N-best decoding algorithm has a relatively small receptive field, and effective recognition results corresponding to the N-best information provided to the two-pass decoding process decrease. Thus, the 1-pass decoding result is improved a lot in the two-pass decoding, and the performance of the audio recognition is affected. Often, the N value is increased to ensure the N-best information provided to the two-pass decoding to include more different effective recognition results. When N is larger, the decoding speed is slower, and decoding is getting more difficult, which causes the decoding efficiency to decrease greatly.

SUMMARY

Embodiments of the present disclosure provide an audio processing method. The method includes obtaining a current to-be-recognized target audio block of a to-be-recognized audio, recognizing text information corresponding to the target audio block to obtain an audio block recognition result, based on the audio block recognition result, determining a first sub-block recognition result corresponding to a current sub-block formed by a starting audio block to the target audio block of the to-be-recognized audio, performing a combination process on identical text sequences of the first sub-block recognition result corresponding to different recognition paths, determining a second sub-block recognition result of the current sub-block based on a result of the combination process, and determining a text recognition result of the to-be-recognized audio based on the second sub-block recognition result. The combination process improves a recognition probability of an identical text sequence matching any one recognition path of the recognition paths corresponding to the identical text sequences.

Embodiments of the present disclosure provide an electronic device, including a memory and a processor. The memory stores at least one computer instruction set that, when executed by the processor, causes the processor to obtain a current to-be-recognized target audio block of a to-be-recognized audio, recognize text information corresponding to the target audio block to obtain an audio block recognition result, based on the audio block recognition result, determine a first sub-block recognition result corresponding to a current sub-block formed by a starting audio block to the target audio block of the to-be-recognized audio, perform a combination process on identical text sequences of the first sub-block recognition result corresponding to different recognition paths, determine a second sub-block recognition result of the current sub-block based on a result of the combination process, and determine a text recognition result of the to-be-recognized audio based on the second sub-block recognition result. The combination process improves a recognition probability of an identical text sequence matching any one recognition path of the recognition paths corresponding to the identical text sequences.

Embodiments of the present disclosure provide a computer-readable storage medium storing a computer software that, when executed by a processor, causes the processor to obtain a current to-be-recognized target audio block of a to-be-recognized audio, recognize text information corresponding to the target audio block to obtain an audio block recognition result, based on the audio block recognition result, determine a first sub-block recognition result corresponding to a current sub-block formed by a starting audio block to the target audio block of the to-be-recognized audio, perform a combination process on identical text sequences of the first sub-block recognition result corresponding to different recognition paths, determine a second sub-block recognition result of the current sub-block based on a result of the combination process, and determine a text recognition result of the to-be-recognized audio based on the second sub-block recognition result. The combination process improves a recognition probability of an identical text sequence matching any one recognition path of the recognition paths corresponding to the identical text sequences.

DETAILED DESCRIPTION OF THE EMBODIMENTS

The technical solutions of embodiments of the present disclosure are described in detail in connection with the accompanying drawings of embodiments of the present disclosure. Apparently, embodiments are only some embodiments of the present disclosure not all embodiments. Based on the embodiment of the present disclosure, all other embodiments obtained by those skilled in the art without any creative effort are within the scope of the present disclosure.

Embodiments of the present disclosure provide an audio processing method and an electronic device, which are suitable for a streaming or non-streaming audio recognition scene. Without increasing the N value of the N-best decoding algorithm, the problem that the receptive field of the decoding algorithm is small in the streaming or non-streaming audio recognition scene can be improved to improve the decoding efficiency and ensure the performance of the audio recognition. The audio processing method of the present disclosure is not limited to being applied to many general-purpose or special-purpose computer device environments or the electronic device under the configuration of the general-purpose or special-purpose computer device environment. For example, the electronic device can include a personal computer, a server computer, a handheld or portable device, a tablet device, a multi-processor device, etc.

Figure 1:
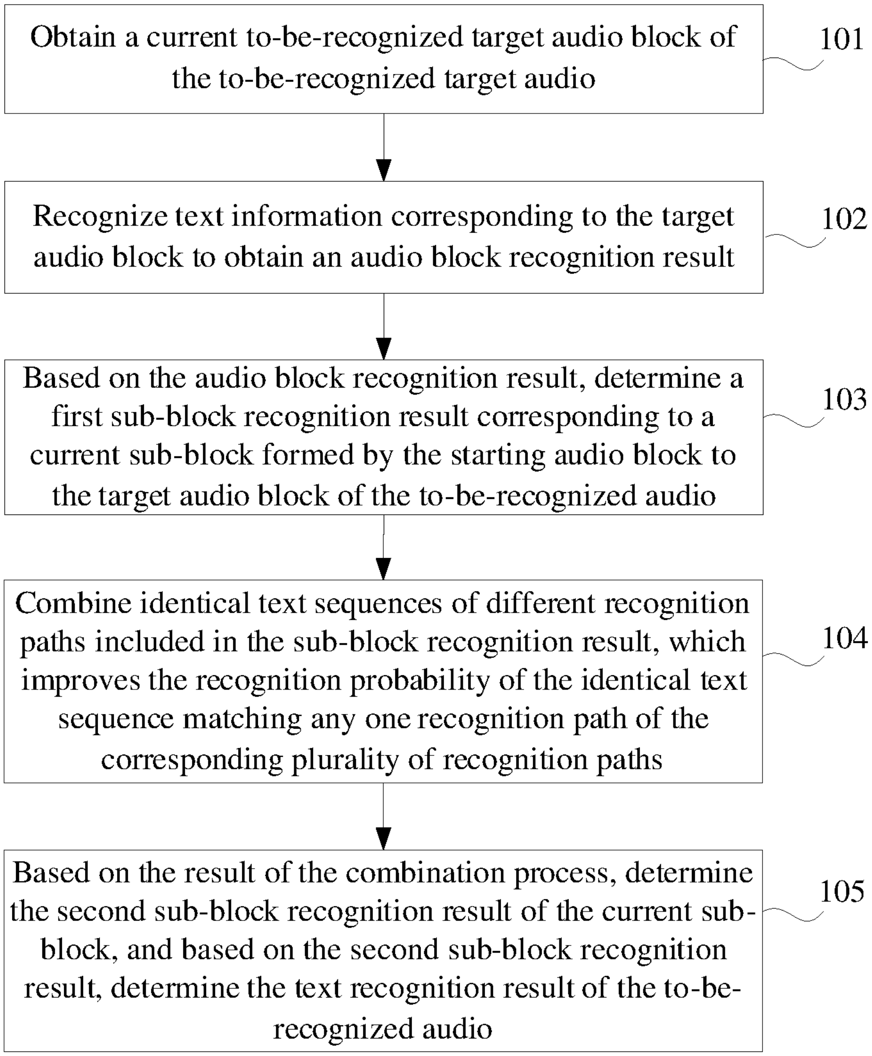
FIG. 1 illustrates a schematic flowchart of an audio processing method according to some embodiments of the present disclosure.

FIG. 1 illustrates a schematic flowchart of an audio processing method according to some embodiments of the present disclosure. The audio processing method includes the following steps.

At 101, a current to-be-recognized target audio block of the to-be-recognized target audio is obtained.

The to-be-recognized target audio can refer to a complete audio sentence/audio segment in the streaming or non-streaming audio recognition scene or fragments obtained by dividing the complete audio sentence/audio segment, which is not limited in the present disclosure. The audio block of the to-be-recognized audio can refer to an audio frame or a plurality of continuous audio frames of the to-be-recognized audio, e.g., the to-be-recognized audio sentence/ audio segment.

In an audio recognition scene, the current to-be-recognized target audio block of the to-be-recognized audio can be continuously entered into the audio recognition module according to the actual recognition speed. The target audio block that is continuously entered can be recognized and processed by the audio recognition model.

In some embodiments of the present disclosure, the audio recognition model using the two-pass (i.e., two times of decoding) module design can be configured to perform audio recognition. That is, a decoding phase of the audio recognition process can include two-pass decoding processing. Correspondingly, the audio recognition model can include an encoding unit and two decoding units, i.e., a first decoding unit and a second decoding unit.

Figure 2:
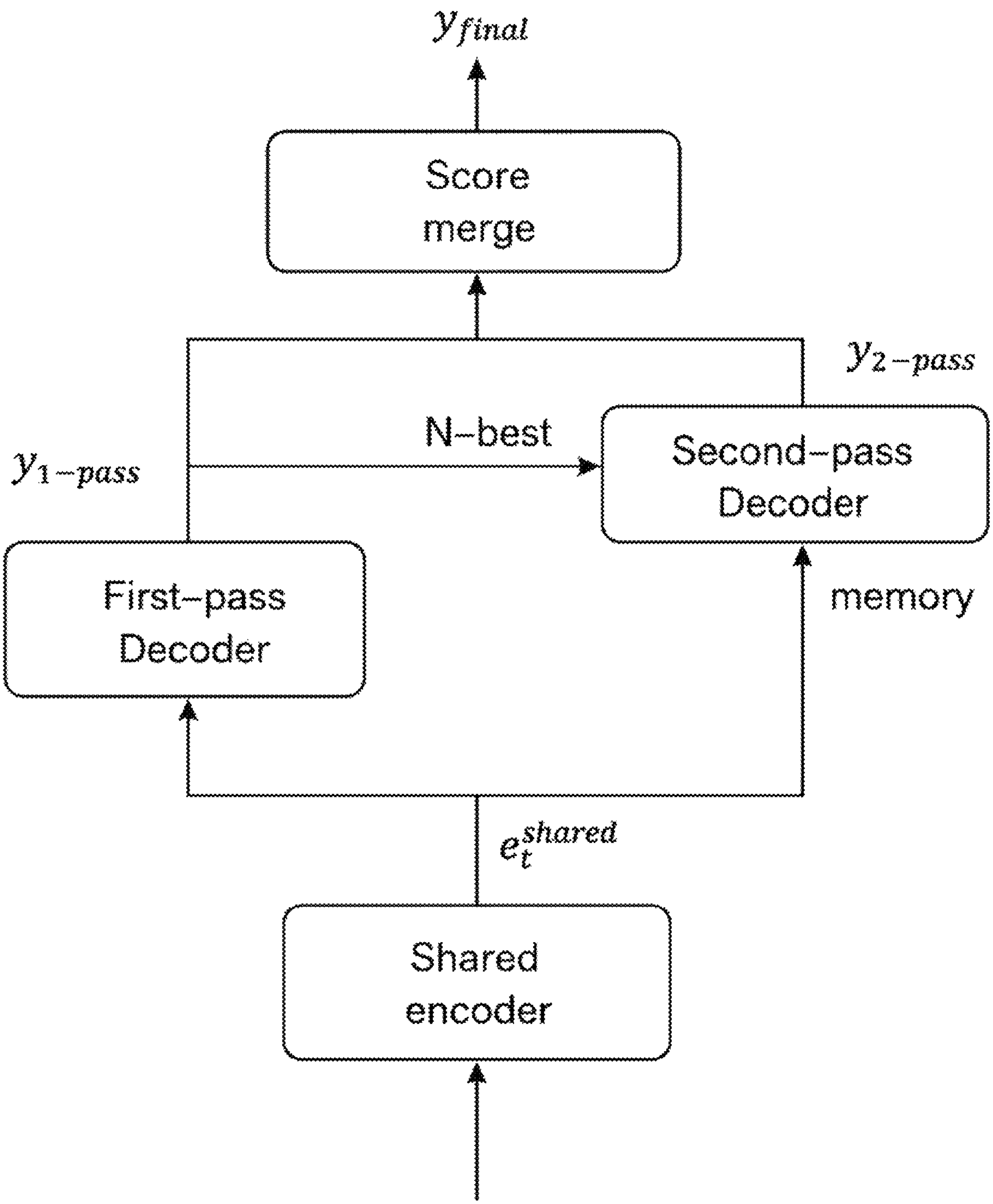
FIG. 2 illustrates a schematic structural diagram of an audio decoding model according to some embodiments of the present disclosure.

The structure of the audio recognition model is shown in FIG. 2. Shared encoder represents the encoding unit, which can be shared and used by the two decoding units. Thus, the encoding unit can also be referred to as a shared encoding unit or shared encoder. First-pass decoder represents a first-decoding unit, which can be also referred to as a one-pass decoding unit or one-pass decoder. The first-decoding unit can be configured to perform one-pass decoding processing on the audio to obtain a one-pass decoding result, e.g., online streaming one-pass decoding result. Second-pass decoder represents a second-pass decoding unit, which can be also referred to as two-pass decoding unit or two-pass decoder. The second-pass decoding unit can be configured to perform two-pass decoding processing on the audio. The performance of the audio recognition can be improved by re-scoring the N-best (i.e., N text results corresponding to probabilities belonging to topN, N being an integer greater than 1) in the one-pass decoding result output by the first-pass decoder. Score merge represents a value fusion unit, which can be configured to fusion an N-best text recognition probability in the one-pass decoding result and an N-best text recognition probability in the two-pass decoding result to obtain a final recognition result of the to-be-recognized audio.

Based on the above structure of the audio recognition model, in Step 101, the to-be-recognized target audio block of the entered to-be-recognized audio can be obtained from the encoding unit, e.g., Shared encoder of the audio recognition model.

At 102, text information corresponding to the target audio block is recognized to obtain an audio block recognition result.

After obtaining the target audio block, audio features of the target audio block can be determined. According to the included audio features, the text information corresponding to the target audio block can be recognized to obtain the audio block recognition result of the target audio block accordingly. The text information can include Chinese text, text in other languages, and character information.

The audio feature of the target audio block can at least include an acoustic feature of the target audio block.

In some embodiments, encoding processing can be performed on the target audio block using the encoding unit of the audio recognition model. An audio feature vector obtained through encoding can be used as the acoustic feature of the target audio block. For the model structure shown in FIG. 2, shared encoder of the model is configured to perform the encoding processing on the entered target audio block to obtain the acoustic feature of the target audio block.

In some other embodiments, in addition to the acoustic feature, the audio feature of the target audio block can also include a language feature. Thus, the language feature and the acoustic feature can be combined to improve the accuracy of the audio recognition.

The language feature of the target audio block can be obtained by processing the language information corresponding to the target audio block. The language information corresponding to the target audio block can be extracted from a language context environment in which the target audio block is located.

For example, previous audio blocks corresponding to the target audio block in the to-be-recognized audio can be used as the context information of the target audio block. The language information corresponding to the target audio block can be obtained based on the context information represented by the previous audio blocks. Thus, in some embodiments, the language information corresponding to the target audio block can be empty, or the audio block recognition result of a previous neighboring audio block with recognized text information of the target audio block. When the target audio block is a first audio block of the to-be-recognized audio, or the previous audio blocks in the to-be-recognized audio corresponding to the target audio block are not recognized for the text information, the language information corresponding to the target audio block can be empty. When the text information of the previous audio blocks in the to-be-recognized audio corresponding to the target audio block is recognized, the language information corresponding to the target audio block can be the audio recognition result corresponding to the last neighboring audio block with the recognized text information. In some embodiments, the audio recognition result can be the N-best information of the recognition result corresponding to the last neighboring audio block with the recognized text information.

In some embodiments, a prediction unit can be introduced in the first decoding unit of the audio recognition model. The feature of the target audio block in the language level can be predicted by introducing the prediction unit to perform the prediction processing on the language information corresponding to the target audio block to obtain the language feature of the target audio block accordingly.

Figure 3:
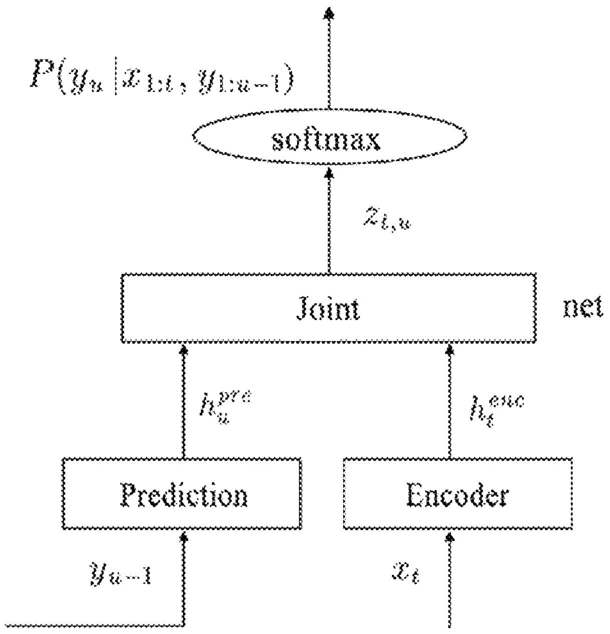
FIG. 3 illustrates a schematic structural diagram showing a part of an audio decoding model after introducing a prediction unit according to some embodiments of the present disclosure.

FIG. 3 illustrates a schematic structural diagram showing a part of the audio decoding model after introducing the prediction unit according to some embodiments of the present disclosure. Encoder represents the encoding unit, i.e., shared encoder, of the model and is configured to perform encoding processing on the entered audio block to obtain the acoustic feature of the audio block. The first decoding unit includes predictor, net, and softmax, which form the one-pass decoder. Predictor represents the introduced prediction unit. Net and softmax represent a decoding network and a normalization unit of the one-pass decoder, respectively. Predictor is configured to perform processing on the language information of the current to-be-recognized audio block to obtain the language feature of the current to-be-recognized audio block, which facilitates the combination of the acoustic feature and the language feature for audio decoding.

After determining the audio feature of the target audio block, the determined audio feature can be input into the decoding network of the first decoding unit for decoding processing. By performing the decoding, the text information corresponding to the target audio block can be recognized according to the audio feature of the target audio block.

If the determined audio feature includes the acoustic feature of the target audio block, the acoustic feature, i.e., the audio feature vector obtained by encoding the target audio block using the encoding unit, can be sent to the decoding network of the first decoding unit for decoding processing.

If the determined audio feature includes the acoustic feature and the language feature of the target audio block, the acoustic feature and the language feature of the target audio block can be sent to the decoding network of the first decoding unit. Thus, the decoding network can be configured to combine the acoustic feature and language feature for audio decoding.

As shown in FIG. 3, assume that the target audio block is denoted as $x_t$, i.e., a t-th audio block of the to-be-recognized audio. After performing the encoding processing on $x_t$, the Encoder (i.e., shared encoder) can input the obtained feature vector $$h_t^{enc}$$

as the acoustic feature of $x_t$ into the decoding network net of the first-pass decoder of the first decoding unit. After performing the prediction processing on the language information $y_{u-1}$ corresponding to $x_t$, the predictor can input the prediction result $$h_u^{pre}$$

as the language feature of the audio block $x_t$ into the decoding network net of the first-pass decoder of the first decoding unit. The decoding network net becomes a joint network, i.e., joint net, after introducing the predictor, which can be configured to decode the audio block $x_t$ by combining the acoustic feature $$h_t^{enc}$$

and the language feature $$h_u^{pre}$$

to obtain recognition probabilities of the audio block $x_t$ corresponding to different pieces of text information in the text recognition space of the model, which is represented as $z_{t,u}$ in FIG. 3. Softmax is the normalization unit, which is configured to map the probabilities of the audio block corresponding to the different pieces of text information in the space recognition space to the range [0,1] to obtain the output of softmax, i.e., $P(y_u|x_{1:t},y_{1:u-1})$ in FIG. 3.

The text recognition space can include a plurality of different pieces of text information provided by the audio recognition model for audio recognition, such as different keywords or key phrases.

In this step, according to the audio feature of the target audio block, the audio block recognition result obtained by performing the target audio block can be obtained by performing the decoding processing on the audio feature of the target audio block by the first decoding unit. The result can be the audio block decoding result output by joint net in FIG. 3, or the resulting output further normalized by softmax, which is not limited.

The audio block recognition result corresponding to the target audio block can include a corresponding relationship between the pieces of text information of the text recognition space and the corresponding recognition probabilities. In some embodiments, the recognition probabilities of the corresponding relationship can include condition probabilities when the target audio block matches the pieces of text information in the text recognition space under a corresponding precondition. Furthermore, the precondition corresponding to the target audio block can include using the audio block recognition results of the previous audio blocks of the to-be-recognized audio corresponding to the target audio as a known condition.

The audio block recognition result corresponding to the target audio can be empty. In some embodiments, the probabilities in the corresponding relationship can be empty. Thus, no effective text information can be recognized from the target audio block. For example, the target audio block can be an audio frame corresponding to a gap between different audios in a sentence.

For example, $P(y_u|x_{1:t},y_{1:u-1})$ output for the audio block can be empty. When $P(y_u|x_{1:t},y_{1:u-1})$ is not empty, $P(y_u|x_{1:t},y_{1:u-1})$ can represent the condition probability of the audio block $x_t$ under the condition formed by the previous audio blocks. In some embodiments, $P(y_u|x_{1:t},y_{1:u-1})$ can represent the conditional probabilities of $x_t$ corresponding to the pieces of text information (e.g., keyword/phrase) included in the text recognition space of the audio recognition model under the know condition of the recognition probabilities of previous t-1 audio blocks and previous u-1 audio blocks with recognized text information of the known to-be-recognized audio. The remaining audio blocks except for the u-1 audio blocks in the previous t-1 audio blocks can be audio blocks without recognized text information, for example, audio frames corresponding to gaps between different audios in a sentence. Audio recognition results corresponding to the remaining audio blocks can be empty.

At 103, based on the audio block recognition result, a first sub-block recognition result corresponding to a current sub-block formed by the starting audio block to the target audio block of the to-be-recognized audio is determined.

The first sub-block recognition result can include text sequences of different recognition paths corresponding to the current sub-block and the recognition probabilities corresponding to the text sequences.

The specific text sequences can be character strings. For example, for the to-be-recognized audio of the audio stream corresponding to "wo ai zu guo" and the to-be-recognized audio block corresponding to "zu," one text sequence of a plurality of text sequences corresponding to the current sub-blocks can be the character string "我爱祖."

After obtaining the audio block recognition result of the target audio block, the first sub-block recognition result corresponding to the current sub-block from the starting audio block to the target audio block can be determined according to the audio block recognition result of the target audio block and the previous recognition result corresponding to the previous audio blocks of the to-be-recognized audio. The process of determining the first sub-block recognition result can include text splicing and probability fusion as follows.

1. The plurality of pieces of text information included in the audio block recognition result of the target audio block and the plurality of different previous text sequences of the target audio block included in the previous recognition results corresponding to the previous audio blocks of the to-be-recognized audio can be spliced to obtain the plurality of text sequences corresponding to the current sub-block to determine the first sub-block recognition result.

The audio block recognition result of the target audio block can be pruned to determine that the corresponding recognition probability belongs to the plurality of pieces of text information of top N probabilities of the recognition probability descending sequence. Each piece of text information of the plurality of pieces of text information of top N probabilities can be spliced at an end of each previous text sequence of the target audio block included in the precious recognition result corresponding to the previous audio block in the to-be-recognized audio. The spliced text sequences can be the text sequence corresponding to the current sub-block.

For the N-best decoding algorithm, the previous text sequences recognized based on the previous audio blocks of the target audio block can retain the N-best result corresponding to the previous text sequence through pruning. That is, the previous text sequence with the recognition probability belonging to TOPN can be preserved from all the previous text sequences of the target audio block.

Correspondingly, the N-Best text information in the audio block recognition result of the target audio block can be individually spliced to the end of each sequence of the N-best previous text sequences of the target audio block to obtain N×N splicing results.

For example, an audio stream corresponding to "wo ai zu guo" can be the to-be-recognized audio. Assume that the target audio block currently recognized can be an audio frame corresponding to "zu," and N-best of the audio block recognition result corresponding to the target audio block can be 6-Best text information, each piece of text information of the 6-Best information can be spliced to 6-Best previous text sequences corresponding to an audio stream "wo ai" that is recognized to obtain 36 splicing results. For example, one splicing result of the 36 splicing results can be "我爱祖".

2. The probabilities corresponding to the currently spliced text information and the previous text sequences are fused. The fused probability is used as the recognition probability of the spliced text sequence.

Meanwhile, the condition probability corresponding to the text information of the target audio block and the recognition probability corresponding to the previous text sequence spliced with the text information can be also fused to obtain a fused probability, which can be used as the recognition probability for the current sub-block. The fusion process can include, but is not limited to, multiplication between probabilities corresponding to the text information and the previous text sequence.

The text sequences corresponding to the current sub-block and the recognition probabilities corresponding to the text sequences can form the first sub-block recognition result corresponding to the current sub-block.

The recognition probability corresponding to the previous text sequence of the target audio block can be obtained through the following processes. Each time when one audio block is recognized in a recognition path corresponding to the previous audio blocks of the target audio block, the recognition probability of the text information corresponding to the currently recognized audio block and the recognition probability of the previous text sequence corresponding to the audio block can be fused until the recognition probability of a last neighboring audio block of the target audio block is fused to obtain a fused result. The fused result can be the recognition probability corresponding to the previous text sequence of the target audio block.

For example, when the text information "祖" from the N-best text recognition result of the target audio block "zu" and the previous text sequence "我爱" corresponding to the previous audio block are spliced into "我爱祖," the condition probability corresponding to "祖" can be fused with the recognition probability corresponding to "我爱" to obtain the fused probability, and the fused probability can be used as the recognition probability for the current sub-block "我爱祖."

The splicing process of the text information corresponding to the target audio block and the corresponding previous text sequence can be implemented in the decoding network (e.g., joint net in FIG. 3) of the first decoding unit of the audio recognition model. The decoding network can decode the audio blocks that are input continuously while the recognized text information and the recognized previous text sequence can be continuously spliced.

At 104, identical text sequences of different recognition paths included in the sub-block recognition result are combined, which improves the recognition probability of the identical text sequence matching any one recognition path of the corresponding plurality of recognition paths.

In the existing technology, the first sub-block recognition result obtained by splicing the text information of the last audio block can be used as the one-pass recognition result of the to-be-recognized audio. Then, N-best information can be filtered from the one-pass recognition result. For example, the N-best information can include the text sequences with the recognition probabilities belonging to the top N in the one-pass recognition result. The N-best information can be then input into the two-pass decoding unit for two-pass decoding processing.

Figure 4:
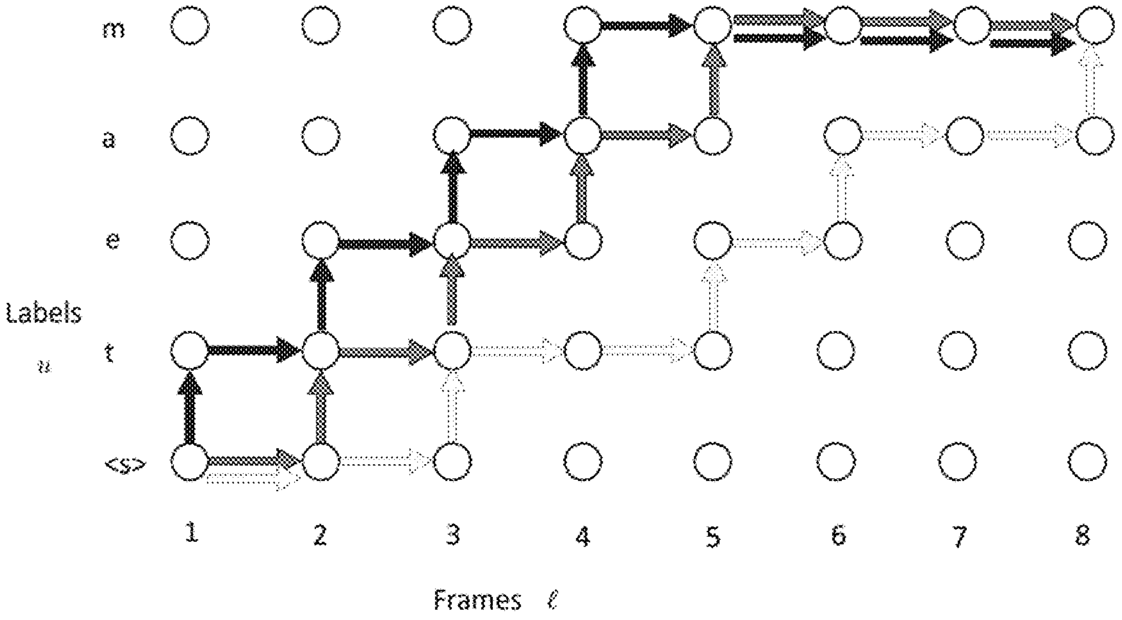
FIG. 4 illustrates a schematic exemplary diagram showing different recognized paths corresponding to an identical text sequence according to some embodiments of the present disclosure.

The inventors have found that the N-best information in the one-pass decoding result often includes identical decoding results with different corresponding decoding paths, which can reduce the receptive field of the N-best decoding algorithm. As shown in FIG. 4, an audio stream corresponding to "team" is the to-be-recognized audio. Each audio frame of the "team" audio stream is a-to-be-recognized audio block. As shown in FIG. 4, three different decoding paths (arrows with a same grayscale belong to a same path) exist for the recognition result of "team." If the recognition result, i.e., "team," belongs to the N-best in the one-pass decoding result, the N-best can actually include N-2 to-be-recognized text results, which does not reach a number N required by the N-best decoding algorithm. Thus, the receptive field is small. Therefore, the one-pass decoding result cannot be improved much in the second-pass decoder, which impacts the final audio recognition performance.

To address the above situation, after decoding at each time step, embodiments of the present disclosure provide a technical approach to combine the identical text sequences corresponding to the time step to improve the issue that the receptive field of the N-best algorithm is small. The decoding of each time step can refer to the decoding of each audio block of the to-be-recognized audio in the one-pass decoding phase. The decoding of each audio block can be considered to correspond to one time step.

Based on the above technical approach, after obtaining the audio block recognition result of the target audio block, the decoding of the current time step can be completed. A combination process can be performed on the text sequences in the first sub-block recognition result of the current sub-block at the current time step. The current sub-block at the current time step can be a sub-block formed by the starting audio block to the target audio block of the to-be-recognized audio.

The combination process can be implemented as follows.

Whether identical text sequences corresponding to different recognition paths exist in the first sub-block recognition result is determined for the current sub-block. If the identical text sequences exist, the recognition probabilities corresponding to the identical text sequences of the different recognition paths can be fused to obtain a fused probability. The fused probability can be used as the recognition probability of the identical text sequences. Otherwise, if the identical text sequences do not exist, fusion is not performed.

Fusing the recognition probabilities of the identical text sequences matching the different recognition paths can include but is not limited to summing up the recognition probabilities of the identical text sequences matching the different recognition paths and using the probability sum as the recognition probability for the identical text sequences. Other fusion algorithms can also be used in practical applications, which are not limited, for example, weighted summation operation. As long as the fused probability is higher than the recognition probability of the identical text sequence of any one path of the plurality of recognition paths, the other fusion algorithms can be within the scope of the present disclosure.

For example, as shown in FIG. 3, assuming that the topN recognition result corresponding to the audio stream "team" includes the text sequence "team." The text sequence "team" corresponds to three different recognition paths. The recognition probabilities of "team" corresponding to the three different recognition paths can be fused, such as summation. The fused probability can be used as the final recognition probability of "team."

At 105, based on the result of the combination process, the second sub-block recognition result of the current sub-block is determined. Based on the second sub-block recognition result, the text recognition result of the to-be-recognized audio is determined.

Then, based on the result of the combination process, the second sub-block recognition result of the current sub-block can be determined. In some embodiments, the plurality of text sequences with the recognition probabilities belong to top N in the recognition probability descending sequence can be determined in the combination process result corresponding to the current sub-block and can be used as the second sub-block recognition result of the current sub-block.

Subsequently, the second sub-block recognition result of the current sub-block can then participate in the processing of the next audio block of the target audio block. For example, splicing and probability fusion can be performed on the second sub-block recognition result and the N-best text information of the next audio block. When the last audio block of the to-be-recognized audio is processed, the second sub-block recognition result of the sub-block corresponding to the last audio block can be used as the first phase recognition result of the to-be-recognized audio. The first phase recognition result can be the one-pass decoding result of the to-be-recognized audio.

For the to-be-recognized audio, in the present disclosure, after the decoding is completed at each time step, i.e., after each time obtaining an audio block recognition result, the combination process can be introduced for the identical text sequences of the different paths in the recognition result of the sub-block at the current time step. Thus, the N-best text sequences obtained based on the combination process can be different from each other. Therefore, the receptive field of the N-best decoding of each time step can be ensured, and the receptive field of the one-pass decoding result that is output at last can be ensured accordingly.

For example, for the to-be-recognized audio stream "wo ai zu guo," assume that 36 splicing results can be obtained by splicing the 6-Best text information (e.g., "祖," "足," "组," "租," . . . ) corresponding to the audio block "zu" and the 6-Best text sequences (e.g., "我爱," "我挨," . . . ) corresponding to the recognized audio stream "wo ai." Assume that three recognition paths corresponding to a text sequence exist in the 6-Best text sequences of the 36 types of splicing results. Thus, with the existing technology, the 6-Best output of the splicing result can only include 4 types of text sequences, which do not reach the N-value required by the N-Best decoding algorithm, i.e., less than 6. The receptive field can be small. In the present disclosure, the identical text sequences of the different paths can be combined. The 6-Best can be filtered based on the combination result to filter out 6-Best text sequences different from each other to satisfy the N value required.

After obtaining the first phase recognition result of the to-be-recognized audio, the N-best in the first phase recognition result, i.e., the N recognition results with the corresponding recognition probabilities belonging to TOPN, can be input into the second decoding unit of the audio recognition model. Meanwhile, the audio feature of the to-be-recognized audio can be input to the second decoding unit. The second decoding unit can be configured to perform the two-pass decoding processing on the to-be-recognized audio based on the input information. In the two-decoding processing, the second decoding unit, e.g., the two-pass decoder, can be configured to perform rescoring and/or reordering on the N-best results of the one-pass decoding result according to the audio feature of the to-be-recognized audio.

In some embodiments, the acoustic feature of the to-be-recognized audio input into the second decoding unit can be the acoustic feature of the to-be-recognized audio, for example, the acoustic feature obtained by encoding the audio block of the to-be-recognized audio by the encoding unit (e.g., shared encoder) of the audio recognition model.

Then, the final recognition probabilities corresponding to the N-best text results of the to-be-recognized audio can be determined in connection with the recognition probabilities of the N-Best text results in the first phase recognition result and the recognition probabilities of the rescored and reordered N-Best text results in the second phase recognition result. Then, the result can be output. For example, based on the final recognition probability, a recognition result with the highest probability can be filtered from the N-Best text results (e.g., the recognition result with the highest probability corresponding to "wo ai zu guo" is filtered to be "我爱祖国") and can be used as an optimal result of the to-be-recognized audio for output.

As shown in FIG. 2, the N-best information of the result output by the one-pass decoder and the N-best information output by the two-pass decoder is sent to score merge, which is configured to fuse the N-best information of the two decoders to obtain the final N-best recognition results of the to-be-recognized audio.

Since the identical text sequences of different paths are eliminated in the one-pass decoding phase, the N text recognition results (i.e., N text recognition sequences) included in the N-best information sent to the two-pass decoder can be different from each other. Thus, the receptive field may not need to be ensured by increasing the value of N. The decoding speed of the overall process can be faster, and the efficiency can be higher.

In summary, in the method of the present disclosure, the identical text sequences from the different paths in the first sub-block recognition result corresponding to the current sub-block of the to-be-recognized audio can be combined. Based on the result of the combination process, the second sub-block recognition result of the current sub-block and the text recognition result of the to-be-recognized audio based on the second sub-block recognition result can be determined. Thus, this approach can avoid the reduction of the receptive field of the N-best decoding algorithm caused by the presence of the same text recognition results of the different paths. Accordingly, without increasing the value N, the N-best information can include more different effective recognition results to improve the decoding efficiency and ensure the audio recognition performance.

To facilitate understanding the one-pass decoding process of the method of the present disclosure, an example is provided as follows.

In embodiments of the present disclosure, when the speech recognition model is trained, a regular training method can be adopted. That is, the combination process of the same texts of the different paths may not need to be introduced in the one-pass decoding process in the model training phase. In some embodiments, the combination process can also be introduced in the training phase, which is not limited.

Figure 5:
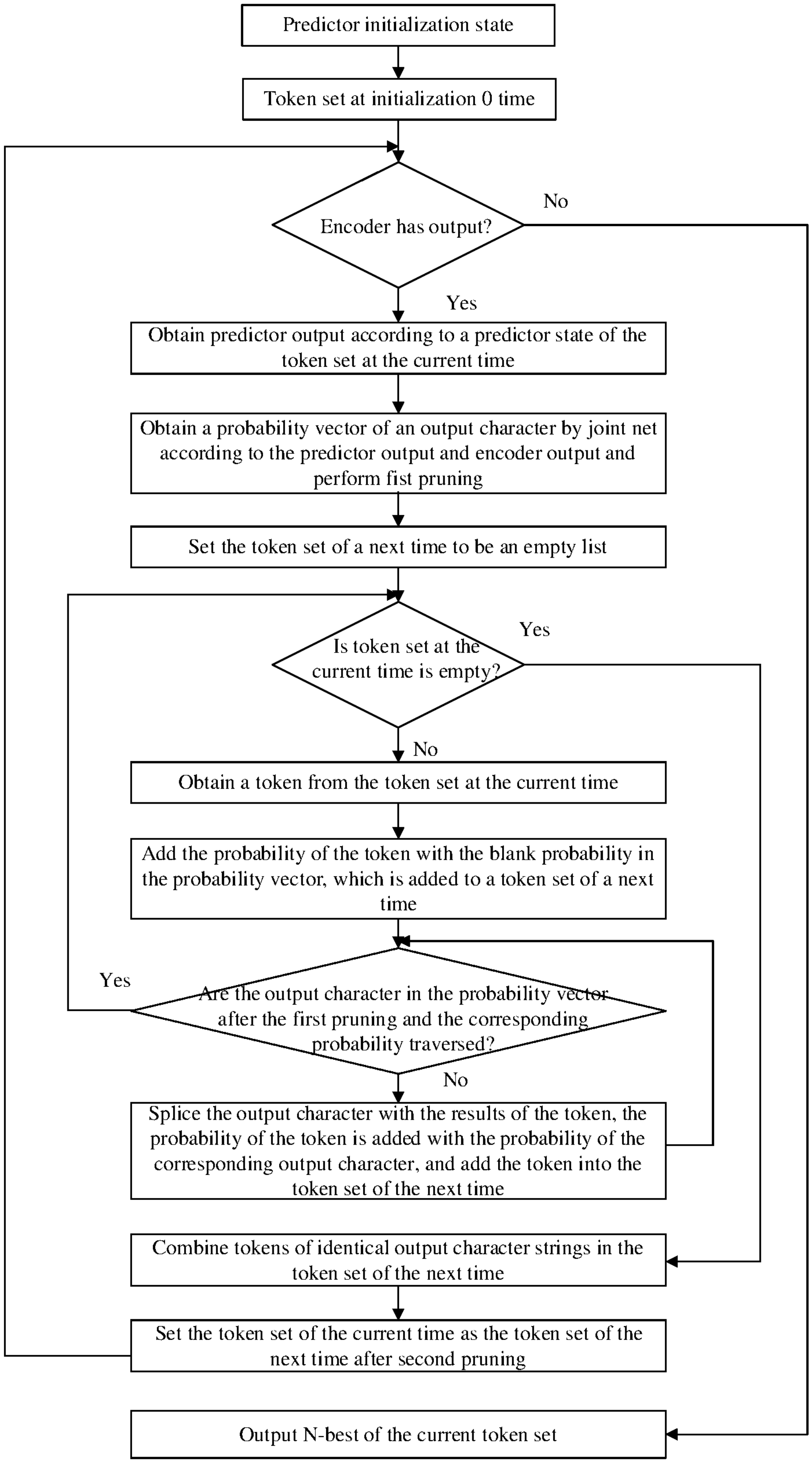
FIG. 5 illustrates a schematic diagram showing a decoding process of decoding an audio based on an audio recognition model according to some embodiments of the present disclosure.

As shown in FIG. 5, based on the trained audio recognition model, performing the one-pass decoding on the audio to realize the audio recognition includes the following processes.

At 201, the state of predictor is initialized, and a current token set is initialized.

In some embodiments, the state of predictor and the token information in the token set can be initialized as blank. That is, an input of the predictor can be initially blank, and the token information of the token set can be blank. A token can be used to record and transmit the recognition state and the state of predictor on the recognition path in the audio recognition process of the to-be-recognized audio.

The recognition state recorded in the token set can include the N-best recognition results of the recognized text sequences corresponding to the recognition paths at the recognition progress of the time step after finishing the one-pass decoding of the current time step. One token can correspond to one recognition path. The state of predictor recorded in the token set can include the N-best recognition results corresponding to the last neighboring audio block of the recognized text information of the current audio block.

At 202, whether encoder has an output is detected. If no, the N-best results of the current token set can be output. If yes, according to the state of predictor in the token set, predictor can obtain the output of predictor.

If the Encoder has no output, no audio block is currently input to Encoder. Accordingly, the one-pass decoding is performed on the last audio block of the to-be-recognized audio. Then, the N-best results recorded in the current token set can be directly used as the N-best of the one-pass result of the to-be-recognized audio for output. Then (or after normalization), the N-best results recorded in the current token set can be sent to the two-pass decoder for two-pass decoding.

Otherwise, if Encoder has an output, the to-be-recognized audio may currently still have audio blocks that need to be processed. Accordingly, the output of predictor can be obtained according to the state of predictor in the token set and can be used as the language feature of the current to-be-recognized audio block.

At 203, joint net obtains the probability vector of the current audio block based on the output of predictor and the output of encoder and performs the first pruning.

Pruning can refer to filtering the text information with the recognition probability belong to TOPN from the recognition results of the text information corresponding to the current audio block in the model text recognition space.

At 204, the token set of a next time step is set to an empty list.

At 205, the current token set is traversed to, for each traversed token, multiply the probability of the token (the recognition probability of the text sequence that is current recognized recorded in the token) with the blank probability of the probability vector to be used as a new token added to the token set of the next time step, and traverse the probability vector after the first pruning to splice the text information corresponding to each probability (condition probability) in the probability vector after the first pruning at a position after the text sequence corresponding to the token and multiply the probability of the text information and the probability of the text sequence to be used as the new token added to the token set of the next time step.

At 206, the tokens of the identical text sequence in the token set of the next time step are combined, and the probabilities of the tokens of the identical text sequence can be summed.

At 207, the token set of the next time step is pruned to be set as the current token set. Then, whether encoder has an output is continuously detected.

Pruning can refer to filtering the N-Best text sequences based on the combination result by combining the probabilities for the identical text sequences.

Figure 6:
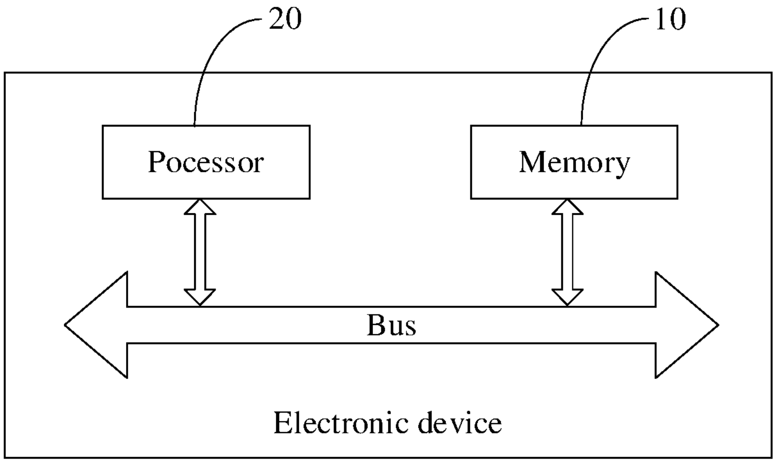
FIG. 6 illustrates a schematic structural diagram of an electronic device according to some embodiments of the present disclosure.

Embodiments of the present disclosure also provide an electronic device. As shown in FIG. 6, the electronic device includes a memory 10 and a processor 20.

The memory 10 can be used to store a computer instruction set.

The computer instruction set can be implemented in the form of a computer program.

The processor 20 can be configured to implementing the audio processing method of embodiments of the present disclosure by executing the computer instruction set.

The processor 20 can include a central processing unit (CPU), an application-specific integrated circuit (ASIC), a digital signal processor (DSP), a dedicated integrated circuit (ASIC), a field-programmable gate array (FPGA), or another programmable logic device.

The electronic device can include a display device and/or a display interface capable of connecting to an external display device.

In some embodiments, the electronic device may also include a camera assembly and/or be connected to an external camera assembly.

In addition, the electronic device can include a communication interface and a communication bus. The memory, the processor, and the communication interface can communicate with each other through the communication bus.

The communication interface can be configured for communication between the electronic device and other devices. The communication bus can include a peripheral component interconnect (PCI) bus or an extended industry standard architecture (EISA) bus, etc. The communication bus can include an address bus, a data bus, a control bus, etc.

Various embodiments described in the specification are described in a progressive method. Each embodiment focuses on the differences from other embodiments. The common and similar parts among the various embodiments can be referred to each other accordingly.

To facilitate description, the above system or device are divided into various modules or units based on functions for description. Of course, when the present disclosure is implemented, the functions of the units can be realized in the same or more pieces of software and/or hardware.

According to embodiments of the present disclosure, those skilled in the art can understand that the present disclosure can be implemented by using software with the necessary general hardware platform. Based on this understanding, the technical solution of the present disclosure, or the part contributing to the existing technology, can be embodied in the form of a computer software product. The computer software product can be stored in a storage medium such as ROM/RAM, a hard disk, a CD, etc., and includes several instructions to enable a computer device (e.g., a personal computer, a server, or a network device, etc.) to execute the methods of various embodiments or certain parts of embodiments of the present discloure.

Finally, in the specification, terms such as first, second, third, and fourth are merely used to distinguish one entity or operation from another, and do not necessarily imply any actual relationship or order between these entities or operations. Moreover, terms such as "including," "comprising," or any variations thereof are intended to cover non-exclusive inclusion, such that a process, method, article, or device comprising a series of elements includes not only those elements but also other elements not explicitly listed, or elements inherent to such process, method, article, or device. Without further limitation, the element limited by the phrase "comprising a . . . " does not exclude the presence of other identical elements in the process, method, article, or device that includes the element.

The above description is only some embodiments of the present disclosure. For those skilled in the art, various modifications and improvements can be made without departing from the principles of the present disclosure. The modifications and improvements should also be within the scope of the present disclosure.

What is claimed is:

1. An audio processing method, comprising:

obtaining a current to-be-recognized target audio block of a to-be-recognized audio;

recognizing text information corresponding to the target audio block to obtain an audio block recognition result;

based on the audio block recognition result, determining a first sub-block recognition result corresponding to a current sub-block formed by a starting audio block to the target audio block of the to-be-recognized audio; and in a first-pass decoding process of a two-pass decoding process:

performing a combination process on identical text sequences of the first sub-block recognition result corresponding to different recognition paths, wherein the combination process improves a recognition probability of an identical text sequence matching any one recognition path of the recognition paths corresponding to the identical text sequences; and determining a second sub-block recognition result of the current sub-block based on a result of the combination process, and determining a text recognition result of the to-be-recognized audio based on the second sub-block recognition result by the first-pass decoding process, before performing a second-pass decoding process of the two-pass decoding process.

2. The method according to claim 1, wherein based on the audio block recognition result, determining the first sub-block recognition result corresponding to the current sub-block formed by the starting audio block to the target audio block of the to-be-recognized audio includes:

splicing a plurality of pieces of text information included in the audio block recognition result and a plurality of different previous text sequences of the target audio block included in previous recognition results corresponding to previous audio blocks of the to-be-recognized audio to obtain a plurality of text sequences corresponding to the current sub-block to determine the first sub-block recognition result.

3. The method according to claim 2, wherein based on the audio block recognition result, determining the first sub-block recognition result corresponding to the current sub-block formed by the starting audio block to the target audio block of the to-be-recognized audio further includes:

fusing recognition probabilities corresponding to the current spliced text information and the previous text sequences to obtain and use a fusion probability as a recognition probability of a spliced text sequence; and determining the first sub-block recognition result of the current sub-block based on the plurality of text sequences corresponding to the current sub-block and recognition probabilities corresponding to the plurality of text sequences;

wherein:

a recognition probability corresponding to the previous text sequences of the target audio block is a fusion result obtained by recognizing an audio block on recognition paths corresponding to the previous audio blocks of the target audio block, and fusing a recognition probability of text information corresponding to the audio block that is currently recognized and a recognition probability of previous text sequences corresponding to the audio block until a recognition probability of a last neighboring audio block of the target audio block is fused.

4. The method according to claim 2, wherein splicing the plurality of pieces of text information included in the audio recognition result and the plurality of different previous text sequences of the target audio block included in the previous recognition results corresponding to the previous audio blocks of the to-be-recognized audio includes:

determining the plurality of pieces of text information in the audio block recognition result with corresponding recognition probabilities belonging to top N of a recognition probability descending order; and splicing each piece of text information of the plurality of pieces of text information of the top N at an end of the plurality of different previous text sequences of the target audio block.

5. The method according to claim 3, wherein:

the audio block recognition result includes a correspondence between pieces of text information and corresponding recognition probabilities in a text recognition space;

the recognition probabilities in the correspondence include condition probabilities of the target audio block matching the pieces of text information in the text recognition space under a corresponding previous condition;

the text recognition space includes the plurality of different pieces of text information provided by the audio recognition model for audio recognition;

the previous condition corresponding to the target audio block includes using the audio block recognition results of the various previous audio blocks corresponding to the target audio block in the to-be-recognized audio as a known condition; and fusing the recognition probabilities corresponding to the text information that is currently spliced and the previous text sequences includes fusing the condition probabilities of the text information that is currently spliced and the recognition probabilities of the previous text sequences.

6. The method according to claim 1, wherein performing the combination process on the identical text sequences of the first sub-block recognition result corresponding to the different recognition paths includes:

determining whether the identical text sequences corresponding to the different recognition paths exist in the first sub-block recognition result; and if the identical text sequences exist, fusing the recognition probabilities of the identical text sequences matching the different recognition paths to obtain and use the fused probability as the recognition probability of the identical text sequences.

7. The method according to claim 1, wherein determining the second sub-block recognition result of the current sub-block based on the result of the combination process, and determining the text recognition result of the to-be-recognized audio based on the second sub-block recognition result include:

based on the result of the combination process, determining the plurality of text sequences of the current sub-block with the corresponding recognition probabilities belonging to top N of a probability descending sequence to be used as the second sub-block recognition result of the current sub-block; and according to a first phase recognition result and an audio feature of the to-be-recognized audio, determining a second phase recognition result of the to-be-recognized audio; and according to the first phase recognition result and the second phase recognition result, determining a text recognition result of the to-be-recognized audio.

8. The method according to claim 1, wherein recognizing the text information corresponding to the target audio block to obtain the audio block recognition result includes:

determining an audio feature of the target audio block; and according to the audio feature, recognizing the text information corresponding to the target audio block to obtain the audio block recognition result.

9. The method according to claim 8, wherein:

the audio feature includes an acoustic feature and a language feature of the target audio block;

determining the acoustic feature and the language feature of the target audio block includes:

using an encoding unit of the audio recognition model to encode the target audio block, and using an encoded audio feature vector as the acoustic feature of the target audio block; and using a prediction unit in a first decoding unit of the audio recognition model to predict language information corresponding to the target audio block to obtain the language feature of the target audio block;

wherein the language information corresponding to the target audio block is language information obtained by extracting information from a language context environment where the target audio block is located.

10. A non-transitory computer-readable storage medium storing a computer software that, when executed by a processor, causes the processor to perform the method according to claim 1.

11. An electronic device comprising:

a processor; and a memory storing at least one computer instruction set that, when executed by the processor, causes the processor to:

obtain a current to-be-recognized target audio block of a to-be-recognized audio;

recognize text information corresponding to the target audio block to obtain an audio block recognition result;

based on the audio block recognition result, determine a first sub-block recognition result corresponding to a current sub-block formed by a starting audio block to the target audio block of the to-be-recognized audio; and in a first-pass decoding process of a two-pass decoding process:

perform a combination process on identical text sequences of the first sub-block recognition result corresponding to different recognition paths, wherein the combination process improves a recognition probability of an identical text sequence matching any one recognition path of the recognition paths corresponding to the identical text sequences; and determine a second sub-block recognition result of the current sub-block based on a result of the combination process, and determine a text recognition result of the to-be-recognized audio based on the second sub-block recognition result by the first-pass decoding process, before performing a second-pass decoding process of the two-pass decoding process.

12. The device according to claim 11, wherein the processor is further configured to:

splice a plurality of pieces of text information included in the audio block recognition result and a plurality of different previous text sequences of the target audio block included in previous recognition results corresponding to previous audio blocks of the to-be-recognized audio to obtain a plurality of text sequences corresponding to the current sub-block to determine the first sub-block recognition result.

13. The device according to claim 12, wherein the processor is further configured to:

fuse recognition probabilities corresponding to the current spliced text information and the previous text sequences to obtain and use a fusion probability as a recognition probability of a spliced text sequence; and determine the first sub-block recognition result of the current sub-block based on the plurality of text sequences corresponding to the current sub-block and recognition probabilities corresponding to the plurality of text sequences;

wherein:

a recognition probability corresponding to the previous text sequences of the target audio block is a fusion result obtained by recognizing an audio block on recognition paths corresponding to the previous audio blocks of the target audio block, and fusing a recognition probability of text information corresponding to the audio block that is currently recognized and a recognition probability of previous text sequences corresponding to the audio block until a recognition probability of a last neighboring audio block of the target audio block is fused.

14. The device according to claim 12, wherein the processor is further configured to:

determine the plurality of pieces of text information in the audio block recognition result with corresponding recognition probabilities belonging to top N of a recognition probability descending order; and splice each piece of text information of the plurality of pieces of text information of the top N at an end of the plurality of different previous text sequences of the target audio block.

15. The device according to claim 13, wherein:

the audio block recognition result includes a correspondence between pieces of text information and corresponding recognition probabilities in a text recognition space;

the recognition probabilities in the correspondence include condition probabilities of the target audio block matching the pieces of text information in the text recognition space under a corresponding previous condition;

the text recognition space includes the plurality of different pieces of text information provided by the audio recognition model for audio recognition;

the previous condition corresponding to the target audio block includes using the audio block recognition results of the various previous audio blocks corresponding to the target audio block in the to-be-recognized audio as a known condition; and the processor is further configured to fuse the condition probabilities of the text information that is currently spliced and the recognition probabilities of the previous text sequences.

16. The device according to claim 11, wherein the processor is further configured to:

determine whether the identical text sequences corresponding to the different recognition paths exist in the first sub-block recognition result; and if the identical text sequences exist, fuse the recognition probabilities of the identical text sequences matching the different recognition paths to obtain and use the fused probability as the recognition probability of the identical text sequences.

17. The device according to claim 11, wherein the processor is further configured to:

based on the result of the combination process, determine the plurality of text sequences of the current sub-block with the corresponding recognition probabilities belonging to top N of a probability descending sequence to be used as the second sub-block recognition result of the current sub-block; and according to a first phase recognition result and an audio feature of the to-be-recognized audio, determine a second phase recognition result of the to-be-recognized audio; and according to the first phase recognition result and the second phase recognition result, determine a text recognition result of the to-be-recognized audio.

18. The device according to claim 11, wherein the processor is further configured to:

determine an audio feature of the target audio block; and according to the audio feature, recognize the text information corresponding to the target audio block to obtain the audio block recognition result.

19. The device according to claim 18, wherein:

the audio feature includes an acoustic feature and a language feature of the target audio block;

the processor is further configured to:

use an encoding unit of the audio recognition model to encode the target audio block, and use an encoded audio feature vector as the acoustic feature of the target audio block; and use a prediction unit in a first decoding unit of the audio recognition model to predict language information corresponding to the target audio block to obtain the language feature of the target audio block;

wherein the language information corresponding to the target audio block is language information obtained by extracting information from a language context environment where the target audio block is located.

20. An audio processing method, comprising:

obtaining a current to-be-recognized target audio block of a to-be-recognized audio;

recognizing text information corresponding to the target audio block to obtain an audio block recognition result;

based on the audio block recognition result, determining a first sub-block recognition result corresponding to a current sub-block formed by a starting audio block to the target audio block of the to-be-recognized audio, by performing:

splicing a plurality of pieces of text information included in the audio block recognition result and a plurality of different previous text sequences of the target audio block included in previous recognition results corresponding to previous audio blocks of the to-be-recognized audio to obtain a plurality of text sequences corresponding to the current sub-block to determine the first sub-block recognition result, performing a combination process on identical text sequences of the first sub-block recognition result corresponding to different recognition paths, wherein the combination process improves a recognition probability of an identical text sequence matching any one recognition path of the recognition paths corresponding to the identical text sequences; and determining a second sub-block recognition result of the current sub-block based on a result of the combination process, and determining a text recognition result of the to-be-recognized audio based on the second sub-block recognition result.

* * * * *